Feb. 17, 1970
F. M. L. H. BERTEIN
3,496,486
GAS LASER HAVING CONCENTRICALLY ARRANGED
HYPERBOLOIDAL TUBE SECTIONS
Filed May 5, 1966
2 Sheets-Sheet 1
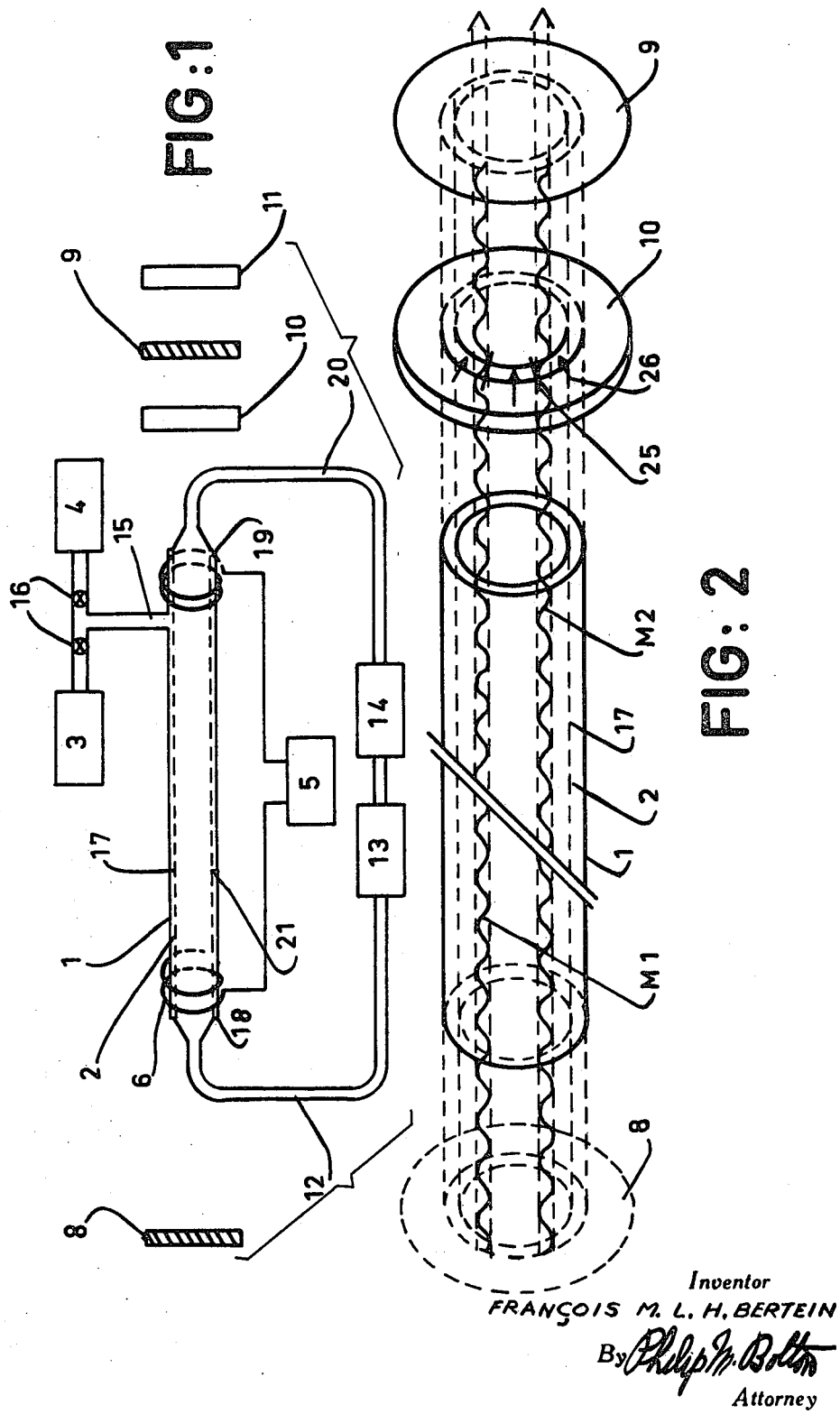
Inventor
FRANÇOIS M. L. H. BERTEIN
By Philip M. Bolton
Attorney

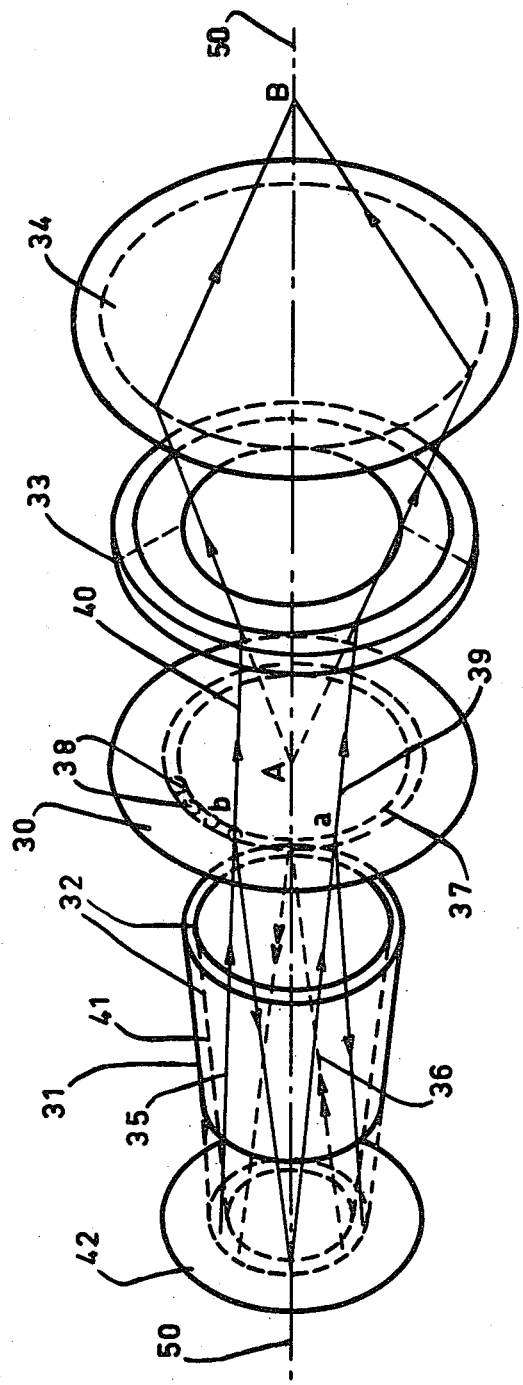
FIG: 3
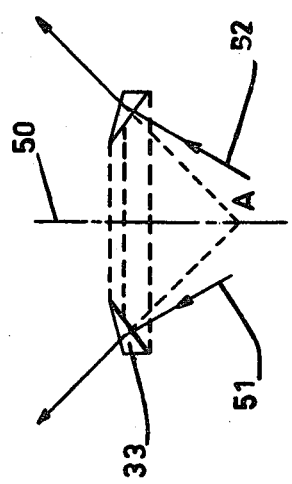
FIG: 4
Inventor
FRANÇOIS M. L. H. BERTEIN
By Rudolph Bolton
Attorney 3,496,486
GAS LASER HAVING CONCENTRICALLY ARRANGED HYPERBOLOIDAL TUBE SECTIONS
François Marie Léon Henri Bertein, Paris, France, assignor to International Standard Electric Corporation, New York, N.Y., a corporation of Delaware
Filed May 5, 1966, Ser. No. 547,858
Int. Cl. H01s 3/00
U.S. Cl. 331—94.5      6 Claims

ABSTRACT OF THE DISCLOSURE

A gas laser comprising internal and external mandrels, cylindrical or hyperboloidal, arranged to form an annular volume which is filled with a gas and excited by means of a hollow coil surrounding the external mandrel and coupled to an oscillation generator. A mirror, plane or spherical, is disposed at each end of the mandrels. A cooling fluid flows through the coil and within the external mandrel. A compensator or mode selector is arranged between the end of the mandrel and the second mirror.

---

The present invention concerns a device making use of the laser effect and concerns more particularly means provided for obtaining a coherent light beam of large power.

It is reminded that the atoms of a gas at thermal equilibrium contained in a closed vessel are distributed statistically according to different states corresponding to energy levels of well-determined values. This distribution is such as the number of atoms N2 which are in the state corresponding to a certain energy level E2 (and it is agreed upon to say that the N2 atoms populate the energy level E2) is generally lower than the number of atoms N1 which populate a lower level of energy E1. This distribution is however only statistical, and though a thermal equilibrium is reached, the atoms will shift from one level to the other by absorbing or emitting a quantity of electromagnetic energy under the form of a photon of frequency $$f = \frac{E2 - E1}{h}$$

h being the Planck's constant; there is absorption when the energy of an atom shifts from the level E1 to the level E2, reversely there is emission which is said to be spontaneous when the energy of the atom shifts from level E2 to level E1; it may thus be said that the atoms of the level E1 are absorbing, whereas those of the level E2 are emitting, and it may be realized that the whole system constituted by the atoms of the levels E1 and E2 is absorbing if $N1 > N2$, this being generally the case, but is emitting if $N1 < N2$. The shifting of the system from the state where $N1 > N2$ to the state where $N1 < N2$, called population inversion, is obtained by a supply of energy coming from an external source, for instance, a high frequency radiation source. In this last case, the transition phenomenon known as stimulated transition, with emission of a radiation of frequency $$f = \frac{E2 - E1}{h}$$

may occur. This radiation is the more intense, this being expressed by saying that the transition gain is the more important as the difference N2—N1 is bigger. It is well understood that other phenomenon the description of which is beyond the scope of the present description, may also influence the transition gain.

If this gain is sufficient for compensating the losses inherent to any physical system, an incident radiation which crosses the closed vessel would leave it more intense than while entering therein. This system constitutes thus a light amplifier which can be transformed into an oscillator by associating thereto a feedback loop realized by means of a Perot-Fabry type interferometer.

This interferometer plays the function of optical cavity in which a coherent light oscillation is set up under the form of several stationary wave systems, or modes having frequencies very close to the transition frequency $$f = \frac{E2 - E1}{h}$$

The energies of the atoms of a gas are obviously distributed not according to two energy levels but according to several energy levels between which certain transitions may be set up, each one having their modes.

Thus, if by any means whatsoever, the power of the exciting source is increased progressively, the first mode which appears is that of the most probable transition and is called main mode of the said transition, then other modes are set up, called secondary modes of the transition; last, other transitions may appear if the exciting source is still increased.

If one of the two mirrors of the interferometer presents a transmission coefficient which matches with the sustaining of the stationary waves, the luminous oscillation which goes out of the interferometer presents itself under the form of a luminous beam the output of which may be measured. For the gas lasers known today, the continuous output power of such a beam ranges about a few milliwatts, whereas the excitation power ranges about several watts, this corresponding to an efficiency of approximately a thousandth.

In spite of this low efficiency, it would be possible to increase the output power by increasing the power of the external source in the same rate, but difficulties are encountered which are linked to the problems of excitation of the gas and of dissipation of the energy.

The object of the present invention is thus to obtain in such a gas laser a high continuous output power.

The present invention will be described with reference to the accompanying drawings in which:

FIGURE 1 represents a schematic example of realization of a gas laser making use of the present invention;

FIGURE 2 represents a configuration of the modes in the case of associated cylinders;

FIGURE 3 represents a configuration of the modes in the case of associated frustums of cones;

FIGURE 4 represents a cross section of the prismatic ring used in the optical device shown on FIGURE 3.

FIGURE 1 represents the diagram of an example of realization of a gas laser making use of the characteristics of the present invention; on this figure, the two mandrels 1 and 2, the circular sections of which are of different diameters, are fitted to one inside the other to create an annular space of a mean radius of a few centimeters and a thickness of a few millimeters over a length of approximately one meter. These two mandrels are maintained in respect one to the other by means of two transparent walls 18 and 19 stuck or welded at their ends; the rigidity of such an assembly may be increased by means of eye-bolts, such as the one referenced 21, welded to the walls of the two mandrels. The annular space 17 is connected through a duct 15 and through a set of valves referenced 16, either to a vacuum pump referenced 3, or to a tank referenced 4, containing the gas with which the laser effect is to be obtained. This gas, which may be for instance a gas mixture helium-neon, may thus be introduced in the said space at a suitable pressure, viz, a pressure of about half a millimeter of mercury. A cooling fluid is circulating through the mandrel 2;

this cooling liquid is brought under high pressure by a duct 20 the diameter of which is small with respect to that of the mandrel 2; this fluid, collected at the outlet of the mandrel 2 by a duct 12, passes through a cooling device 13, then through a pump 14 which re-injects it in the mandrel 2. An oscillating generator at the frequency of twenty megacycles, referenced 5, enables the supply to the gas contained in the annular space 17 of an excitation power of a few kilowatts, by means of a solenoid 6 which comprises some twenty turns surrounding the external mandrel 1; the solenoid turns are hollow, in order to allow therein the circulation of a cooling fluid by means of a device not shown on the figure.

The two mandrels, assembled as described, are located between two plane and slightly spherical mirrors referenced 8 and 9; the mirror 8 presents a reflection coefficient which is attempted to make equal to unit, whereas the mirror 9 presents a slight transmission coefficient enabling the outgoing of part of the luminous waves which are set up between the two mirrors when the laser effect takes place. The luminous beam, of annular shape, as it will appear further on, which goes out of the mirror 9, is concentrated in a point by means of an optical device referenced 11. The symbol referenced 10 designates a ring surrounding the luminous beam which is used as a carrier to the elements known as "compensators" and "modes selectors", the nature and roll of which will be stated further on.

In such a device, the appearance of the laser effect will be better understood by the following explanation in relation with FIGURE 2 in which only certain elements of FIGURE 1 have been represented on a larger scale and in an isometric projection; viz. the two mandrels 1 and 2 which realize the annular space 17, the two mirrors 8 and 9 which constitute the optical cavity, last the carrier 10 of the "compensators" and "modes selectors" elements. In order to respect the relative dimensions of the different elements, only the ends of the mandrels 1 and 2 have been represented.

Although the theory of the setting up of the laser effect in such a device belongs to the field of the wave optics, the present description will be limited to geometrical optics considerations enabling a simpler statement which does not prejudice the description of the apparatus.

As it has been said previously, the gas contained in the annular space 17 is excited through a solenoid 6 (FIGURE 1) connected to a generator 5 (FIGURE 1) which may supply an output of a few kilowatts. If, by any means whatsoever, the exciting power is increased progressively, a fluorescent discharge illuminating the annular space will be first observed and the gas contained therein behaves then as a conductive material of a certain resistivity, in particular all the discharge current is practically contained in ring space the thickness of which is given by the well-known skin-effect formula, viz. approximately a thickness of a few millimeters for a frequency of twenty megacycles; thus, this discharge known as ring discharge enables to supply the gas in energy localized mainly in the neighbourhood of the annular space.

When the exciting power increases it becomes, at a given value, sufficient for producing the occurrence of the main mode, referenced M1, of the most probable transition, and the propagation direction is that of one generating line of the mandrel; this mode is called filamentary mode since its transversal dimensions are small with respect to its longiutdinal dimensions; M1 deactivates the gas on its path, but not elsewhere; therefore when the exciting power still increases, other modes, such as the one referenced M2, are set up according to other generating lines of the mandrel and the laser effect may be extended to the whole annular space. In these modes, certain correspond to modes which are identical to the main mode M1 to which are associated the secondary modes, whereas others correspond to the main and secondary modes presented by other less probable transitions. These different superimposed modes may be considered as many laser beams in parallel, the energies of which are added, thus corresponding then to a laser beam of a high energy.

These modes, which correspond to frequencies slightly different, oscillate side by side independently one from the others, and if a single monochromatic oscillation is to be obtained, it is necessary to couple them together; to this effect, elements known as "compensators" such as transparent plates referenced 25 and metallic needles referenced 26 carried by a ring 10, are used. Thus, a transparent plate with a thickness of approximately one millimeter is arranged obliquely on the path of one oscillation with an inclination such as a part of the beam is reflected towards the adjacent space where another mode oscillates. These two adjacent modes merge together into one single oscillation owing to this coupling; other transparent plates enable to couple the modes the ones with the others and to obtain an oscillation in monochromatic layer. A metallic needle such as 26, the point of which is adjusted in the neighbourhood of an oscillation diffracts a part of the light it shuts out, and contributes to couple the modes between themselves. These plates and needles will be adjusted from place close between, in order to extend progressively the oscillation and to regulate it. In order to facilitate the fitting and the setting of these different elements, they have been arranged outside the annular space on the ring 10 the internal circle diameter of which is such as the said circle does not shut out the luminous beam.

Owing to the presence of a cooling device, the ducts 12 and 20 (FIGURE 1), which enable to allow the circulation of a cooling liquid inside the mandrel 2, cut off necessarily the luminous beam and prevent the passage of the oscillation; care will be taken to arrange these ducts in such a way as to be over one same generating line of the mandrel; care will also be taken in order that the cross section presented to the luminous beam be minimum; and it is advantages to use ducts the cross section of which, in the plane perpendicular to FIGURE 1, is small.

Although the different modes are set up theoretically according to the generating lines of the mandrel, and oscillate side by side in a way independent the ones from the others, modes exist however the propagation direction of which is not that of a generating line and which, because of that, couple between themselves adjacent modes; this coupling is undesirable if a strongly monochromatic oscillation corresponding to modes of close frequencies is to be obtained, so that it is necessary to isolate the said modes by using longitudinal opaque partitions according to the generating lines of a mandrel. If for certain applications of the output luminous beam, a laser oscillation limited to one or several longitudinal bands is sufficient, opaque masks will be placed on the path of the oscillations which are to be suppressed. These partitions and masks may be placed outside the discharge and be maintained fixed by means of a sleeve surrounding the annular beam or by means of rings such as the one referenced 10 which is also used as carrier to the "compensator" elements.

The luminous beam of annular shape which goes out of the mirror 9 may therefore occupy a big part of the ring (except at the location of the ducts 12 and 20) if the coupling is sufficient, or may be limited to certain sections if partitions or masks are available. This beam may be concentrated into one point by an optical device 11 (FIGURE 1) which is in this case a convex lens.

The two mandrels 1 and 2 (FIGURES 1 and 2) may be replaced by two frustums of cones of approximately one meter length and of mean radius a few centimeters, associated in the same way as the mandrels. In such a device, the occurrence of the laser effect will be better understood by means of FIGURE 3, in which the annular space 41 is realized by means of two frustums of cones 31 and 32 fitted one inside the other in order to leave a distance of approximately a few millimeters between the facing walls. In this figure, the frustums of cones have been represented with a very short length with respect to their diameter in order to enable an easier representation.

This annular space, closed at its ends by means of transparent walls, is located between two mirrors, the first one plane referenced 42, arranged on the side of the apex of the frustums of cones, the other spherical referenced 30, arranged on the side of the base of the said frustums of cones; the curvature radius of this spherical mirror will be determined according to the configuration of the luminous beams it is desired to obtain between the two mirrors. On this figure, the "compensators" and "modes selectors" elements, which are similar to those used in the case of cylindrical mandrels, have not been represented.

Between these two mirrors 30 and 42, luminous beams may be set up which may be filiform laser oscillation modes, zigzag shaped surrounding the symmetrical axis 50 of the frustums of cones, and either reclosing or not on themselves after one turn. These zigzags are progressive waves the propagation of which may be carried out in one direction as well as in the other directions; thus on FIGURE 3, the symbol referenced 35 designates a progressive wave which propagates in one direction, whereas the symbol referenced 36 designates a progressive wave which propagates in the other direction, the arrows indicating the propagation direction.

If N designates the number of go and return paths of the luminous ray which enable to carry out a complete turn around the axis of symmetry, the radius R given in meters of the spherical mirror 30 is given by the formula:

$$R = \frac{L}{\sin^2 \frac{\pi}{N}}$$

in which L designates the distance between the two mirrors given in meters.

If N is sufficiently high, the preceding formula may be written $$R = \frac{N^2 L}{10}$$

this giving, R=20 meters, if N=10 and L=2 meters.

In this figure, the excitation device which is similar to that of FIGURE 1, and which is mainly constituted by some twenty turns, surrounding the frustum of cones 31, connected to the terminals of an oscillator of twenty megacycles frequency which supplies an output of a few kilowatts, has not been represented. When the excitation power increases, a first mode is set up then a second one, and so on, up to the time where the laser effect occupies the whole space; the modes form a layer having a hyperboloidal shape which may be considered as similar to a frustum of cone if N is large as it is the case in the present achievement. It is observed that the frustums of cones 31 and 32 should have in fact hyperboloidal sections, the neck circles of which should be the intersections of the hyperboloids with the plane mirror 42.

As it has been seen previously, the oscillations run over the whole annular space, and this way of propagation facilitates the coupling between the different modes, so that the "compensator" elements play a less important role and if they are used they will be similar to those used in the case of the cylinders. (FIGURES 1 and 2).

The purpose of the "modes selector" system is in this case to keep the only zigzags which corresponds to the value N chosen; it may consist into an assembly of small shutters arranged in the beam with an angular periodicity $2\pi/N$ around the axis of the cones.

If a part of the energy contained in the luminous beam has to be used, one of the mirrors, 30 for instance, must be slightly transmitting and the output beam of this mirror extends the hyperboloidal layer obtained between the mirrors 42 and 30. This beam is divergent and, if it is required to concentrate it in one point, it must be made to pass through an optical device constituted by shutters arranged at the output of the mirror 30, a prismatic ring 33, and a lens 34. In effect, at the output of the mirror 30, the luminous sources are available all along a circular ring 37 of radius $r$ and form an oscillation of the shape $$\cos\left(\omega t \pm \frac{2\pi s}{d}\right) \text{ with } d = \frac{\lambda L}{r \sin \frac{\pi}{N}}$$

which may be written: $d = N\lambda L/\pi r$ if N is large.

N, L and R have been defined previously:

$\lambda$ designates the wavelength of the oscillation;
$\phi = 2\pi/\lambda$ designates the oscillation pulse;
$s$ designates the abscissa on the circular ring 37.

The two signs correspond respectively to an oscillation rotating in one direction and to that rotating in the other direction; these sources are therefore out of phase and it is advantageous to keep only the parts which are in phase by means of a diaphragm presenting small holes 38 arranged along the circular ring 37 and spaced by a distance $d$.

A prismatic ring 33, the cross section of which is given on FIGURE 4, concentrates, for instance, two rays 39 and 40, coming respectively from the points $a$ and $b$ of the circular ring 37 into a virtual point A of the axis of symmetry 50, then a convex lens 34, making them converge to a real point B located on the axis of symmetry 50. It has to be noted that the optical device described hereabove can be arranged on the side of the plane mirror 42 which will be made slightly transmitting.

As in the case of an annular space achieved by means of circular cross section mandrels, care will be taken in order that the position of the cooling ducts with respect to the ring and their section in the plane perpendicular to the beam, hinder to the minimum the oscillation.

FIGURE 4 gives a cross section of the prismatic ring 33 cut out in the plane of FIGURE 3 and shows the path of two luminous rays 51 and 52 which after passage through the prismatic ring seem to come from a virtual point A located on the axis of symmetry 50.

While the principles of the above invention have been described in connection with specific embodiments and particular modifications thereof it is to be clearly understood that this description is made by way of example and not as a limitation of the scope of the invention.

What I claim is:

1. A gas laser, comprising:
    internal and external mandrels in the form of hyperboloidal sections concentrically arranged to form an annular volume;
    a gas contained in said annular volume;
    means to excite said gas;
    a first plane mirror disposed at one end of said mandrels; and
    a second spherical mirror disposed at the other end of said mandrels.

2. A gas laser as in claim 1 in which said means to excite said gas includes:
    a solenoid surrounding said external mandrel; and
    a high frequency, high power oscillating generator coupled to said solenoid.

3. A gas laser as in claim 2 in which said solenoid comprises a plurality of hollow turns, further including cooling fluid flowing within said hollow turns.

4. A gas laser as in claim 1 in which said external mandrel has a cooling fluid flowing therein.

5. A gas laser as in claim 1, further including a compensator device arranged between an end of said mandrels and said second mirror to enable a single monochromatic oscillation to be obtained.

6. A gas laser as in claim 1 further including a mode selector arranged between an end of said mandrels and said second mirror to omit undesired modes.

References Cited

UNITED STATES PATENTS

| | | | |
|---|---|---|---|
| 3,055,257 | 9/1962 | Boyd et al. | 331—94.5 |
| 3,136,959 | 6/1964 | Culver | 331—94.5 |
| 3,222,615 | 12/1965 | Holly | 331—94.5 |
| 3,253,226 | 5/1966 | Herriott et al. | 331—94.5 |
| 3,309,621 | 3/1967 | Evtuhov et al. | 331—94.5 |
| 3,311,843 | 3/1967 | Friedl | 331—94.5 |
| 3,349,339 | 10/1967 | Thorington | 331—94.5 |

OTHER REFERENCES

Goldsborough et al.: "RF Induction Excitation of CW Laser Transitions in Ionized Gases," Applied Physics Letters, vol. 8, No. 6, pp. 137–39, Mar. 15, 1966.

RONALD L. WIBERT, Primary Examiner

E. BAUER, Assistant Examiner

U.S. Cl. X.R.

330—4.3